Oct. 11, 1938.　　　O. K. KELLEY　　　2,133,053
CLUTCH OPERATING MECHANISM
Filed July 16, 1932　　　2 Sheets-Sheet 1

Inventor
Oliver K. Kelley
By Blackmore, Spencer & Flint
Attorneys

Oct. 11, 1938.   O. K. KELLEY   2,133,053
CLUTCH OPERATING MECHANISM
Filed July 16, 1932   2 Sheets-Sheet 2
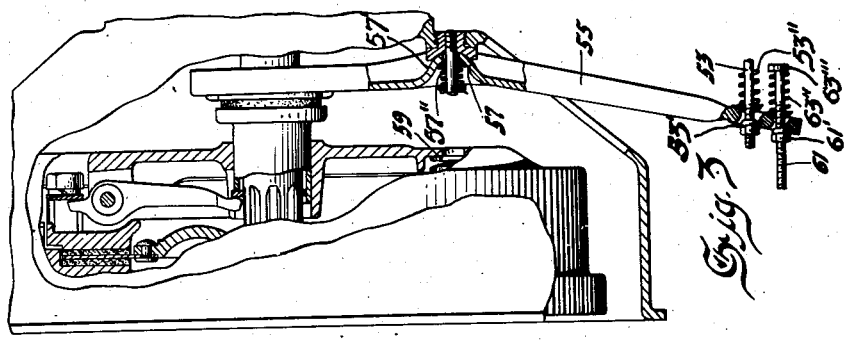
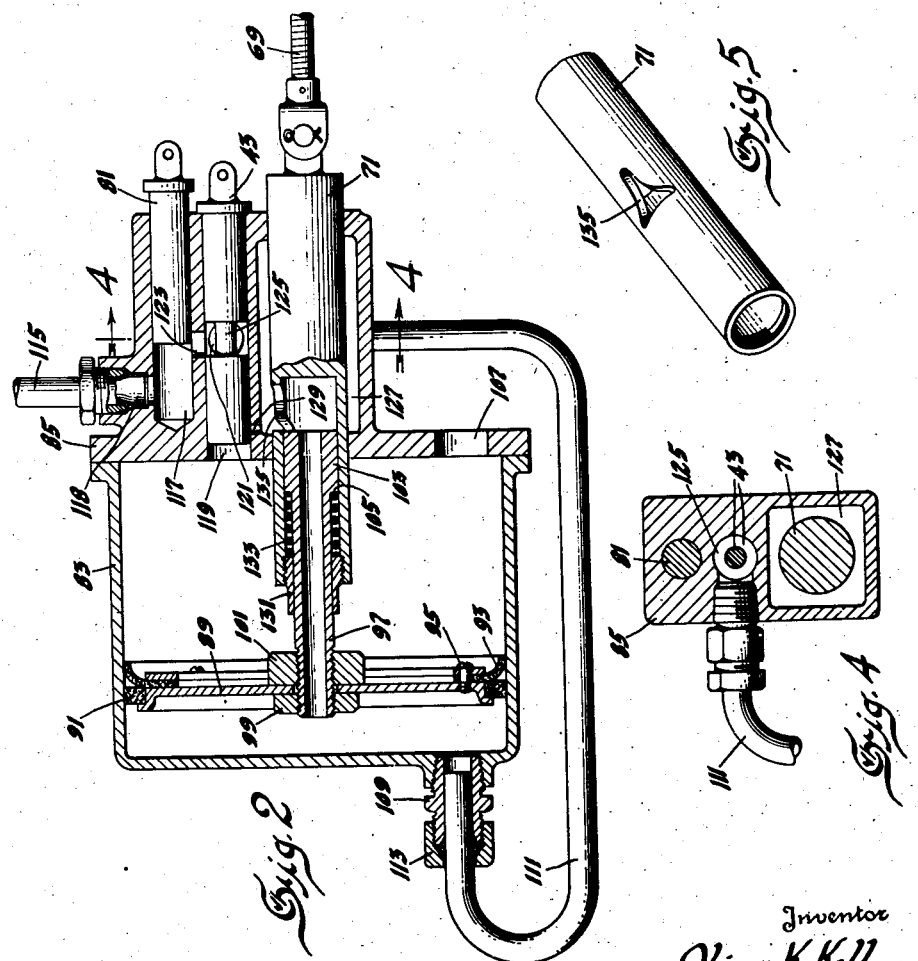
Inventor
Oliver K. Kelley
By Blackmore, Spencer & Flint
Attorneys Patented Oct. 11, 1938

2,133,053

UNITED STATES PATENT OFFICE 2,133,053

CLUTCH OPERATING MECHANISM

Oliver K. Kelley, Pontiac, Mich., assignor to Yellow Truck and Coach Manufacturing Company, Pontiac, Mich., a corporation of Maine Application July 16, 1932, Serial No. 622,998

22 Claims. (Cl. 192—.01)

This invention relates to a fluid pressure device or motor for performing work.

As a major object the invention aims to provide a fluid pressure motor associated with the clutch of a motor vehicle whereby the clutch is released and reengaged in an improved manner.

As a further object the invention employs preferably sub-atmospheric pressure derived from the intake manifold of the engine as the fluid pressure medium.

Other objects include simplicity of construction and efficiency in operation.

The invention is illustrated in the accompanying drawings in which—

Fig. 2 is a vertical section through the power unit.

Fig. 3 is a plan view, partly in section, of the clutch-operating device.

Fig. 4 is a section on line 4—4 of Fig. 2.

Fig. 5 is a perspective of a detail.

Figure 1:
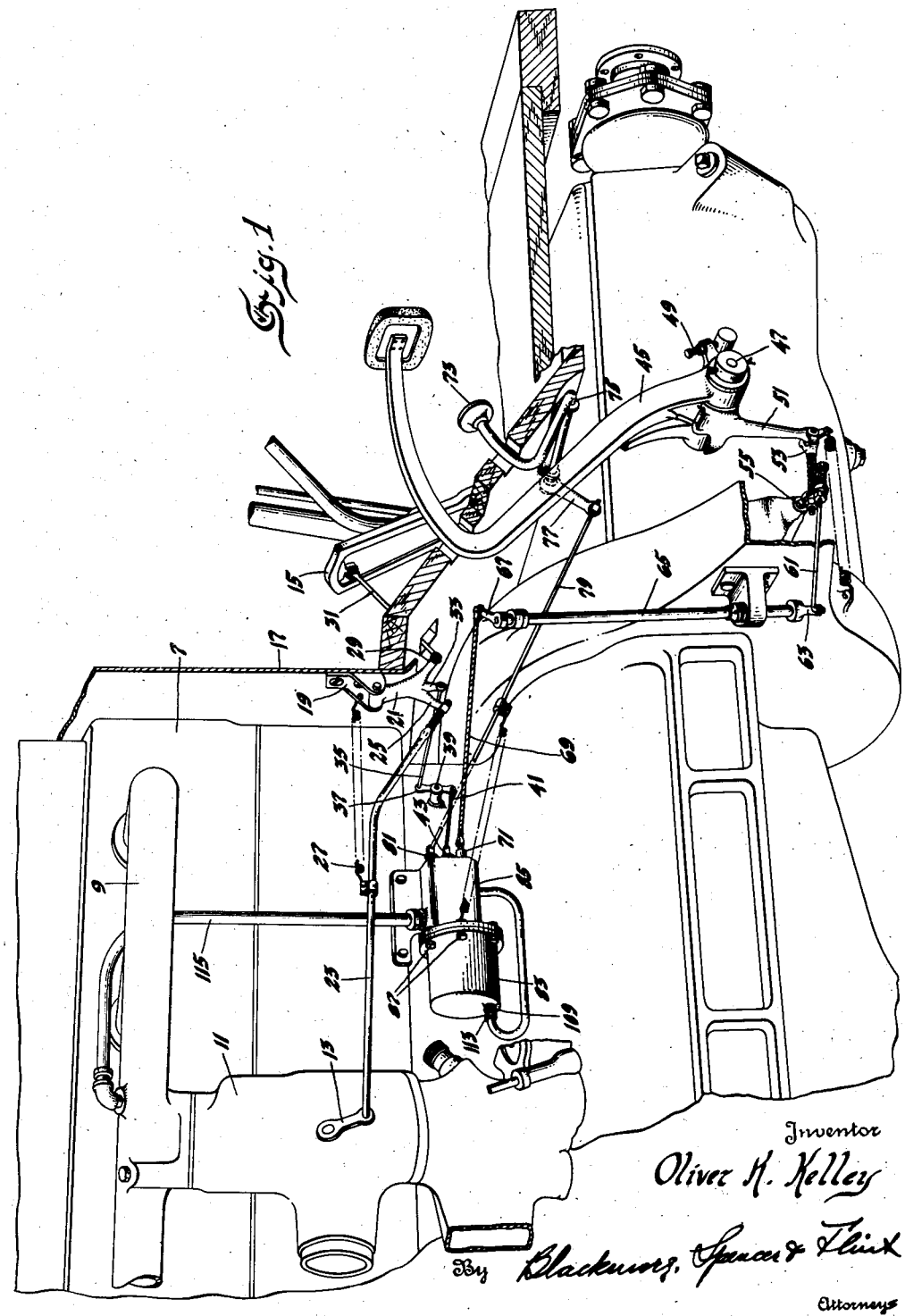
Fig. 1 is a side elevation of a part of a motor vehicle showing my invention applied thereto.

Referring by reference characters to the drawings, numeral 7 is used to designate the engine of a motor vehicle. The engine is shown equipped with the usual intake manifold 9. The throttle valve in the header 11 between the carburetor and the manifold is operated by a lever 13. At 15 is shown the accelerator pedal which is designed to control the throttle. Numeral 17 represents a part of the dash to which is secured a bracket 19. On the bracket 19 is pivoted a three-arm lever 21. A link 23 connects the throttle lever 13 to one arm 25. A spring 27 is connected to link 23 and to some fixed point for the purpose of holding the throttle in its closed or engine idling position. A second arm 29 is connected by a link 31 to the pedal 15. The third arm 33 is connected by a link 35 to one arm of a lever 37 conveniently pivoted at 39. From the other arm of the lever 37 a link 41 is connected to a plunger 43 of a combined power unit and control valve mechanism to be further described.

At 45 is a clutch pedal rotatable about a shaft 47. The pedal carries an adjustable abutment 49 to limit its movement of release. In operation the clutch pedal rotates counter-clockwise and engages and rotates a lever 51. This lever 51 is connected by a rod 53 to the end of the clutch-releasing lever 55. Rod 53 has a head 53' engaging the lever and a spring 53'' surrounds rod 53 and is positioned between an abutment on the rod 53 and the lever 55 as shown by Fig. 3. The lever 55 rotates about its fulcrum 57 and through suitable mechanism operates to release the clutch against the action of springs 59 normally functioning to render the clutch operative. Fulcrum 57 may be made as desired but is shown as having a spherical engaging surface 57' held to its seat by a spring 57''. The clutch is no part of the invention and is not illustrated except to the extent described.

The clutch may also be released by a rod 61 which is arranged to act in compression to similarly rotate lever 55. Rod 61 has a head 61' engaging the lever 55 and a spring 63'' between the lever and an end abutment 63'''. The connection of the rods 53 and 61 with the lever 55 is such that the lever may be rocked by either of these rods without interference from the other. Rod 61 is connected to an arm 63 on a vertically-disposed rock shaft 65. At the upper end of the rock shaft is an arm 67 which is connected by a tension member, preferably a flexible cable 69 to a second plunger 71.

On the floor board of the car is a control button 73 carried by a lever member 75. The lever is also provided with an arm 77 which is connected by a rod 79 to a third plunger 81.

The combined power unit and valve mechanism comprises a preferably cylindrical housing 83 constituting the power cylinder and a combined cover and valve assembly represented by numeral 85. These two parts are secured together by fastening means 87. In the power cylinder 83 is a piston 89 having a tight fitting ring 91 and a cup member 93, the latter held by fastening means 95. The piston rod 97 is hollow and is secured to the piston by nuts 99 and 101. The end of the piston rod remote from the piston is enlarged as at 103, forming a shoulder 105. An opening 107 in the cover 85 maintains that side of the cylinder to the right of the piston open to the atmosphere. Into the opposite end of the cylinder is screwed a fitting 109, and the end of a conduit 111 enters into and is held in position on this fitting by a nut 113.

From the manifold 9 a pipe 115 extends to an opening in the cover part 85. The cover 85 has an opening 117 dimensioned to receive the plunger 81. An opening 118 in the cover 85 affords communication between the pipe 115 and the passage 117. A second tubular passage 119 is formed in the cover or head 85, this second passage extending from the outside of the head to the region of the cylinder to the right of the piston. Reciprocable in this second passage is the plunger 43. It is with this passage 119 that pipe 111 communicates, the opening being represented by numeral 121. Between the passages 119 and 117 is an opening 123. The plunger 43 has a reduced part between its ends which reduced part is represented by numeral 125. By this means there is communication between the cylinder at the left of the piston, through pipe 111, opening 121, opening 123, passage 117, and pipe 115 to the manifold when the plungers 81 and 43 are in the position shown by Fig. 2.

The head 85 has a third elongated chamber 127. At the ends of this chamber are walls guiding the third plunger 71. This plunger is hollow for a part of its length as shown in Fig. 2. Between the chamber 127 and the passage 119 is an opening 129. The plunger 71 telescopes over the piston rod 97. A closure ring 131 is threaded into the open end of the plunger 71 and slidably engages the piston rod. The enlarged end 103 of the piston rod has a sliding fit with the plunger 71. A spring 133 is located within the hollow part of plunger 71 and engages the head 131 at one end and the shoulder of the piston at the other end. The plunger is also provided with a tapered opening 135 affording communication between the internal cavity of plunger 71 and the chamber 127.

The operation of the device is as follows: Figs. 1 and 2 show the parts in the position they occupy when the button 73 is depressed to render the power declutching device operable and when the accelerator pedal is released in consequence of which the power cylinder has released the clutch. The pressure on button 73 is holding plunger 81 in such a position that there shall be free communication between the pipe 115 through passage 117 and opening 123. The release of the accelerator pedal 15 has caused lever 21 to rotate, thereby closing the throttle. This motion has advanced plunger 43 so that its portion of reduced diameter affords communication between the opening 123 and the pipe 111. When the plungers 81 and 43 are in this position as stated, there is free communication between the manifold and the part of the cylinder to the left of the piston 89. Since the region of the cylinder at the right of the piston is open to the atmosphere, the unbalanced pressure has caused the piston to move to the left as shown. In so moving, it has pulled plunger 71 through spring 133 and has operated the cable 69 and related parts to release the clutch against the tension of the clutch spring 59. Incidental to this movement, it will be seen that the relative operating movements of the piston 89 and the plunger 71 has opened the communication between the chamber within the plunger 71 and the chamber 127. This does not vent the suction side of the piston, however, because the opening 129 is closed by the plunger 43.

The parts will be positioned as above described when stopping the car and also when the throttle is allowed to close prior to gear shifting. When now it is desired to start, as after stopping or after gear shifting, the button 73 being still held depressed, the pedal 15 is pushed forward. As the throttle is opened the plunger 43 is pulled out. As the driver applies his foot to the accelerator, plunger 43 reciprocates in a direction to close port 123 and to open port 129. The parts are dimensioned so that when port 129 is fully opened, port 123 is not quite closed. Port 129 is of less axial length than port 123. It is intended that the movements of the plunger 43 shall gradually close port 123 but that port 129 is opened and closed quite abruptly. Because of the short axial length of port 129 only short movements are required of plunger 43 to change it from a fully opened to a fully closed position. If it be necessary in order to provide adequate venting, port 129 may be elongated circumferentially while still retaining its axial dimension. As soon as port 129 is opened bleeding of vacuum from behind the piston occurs, but as the suction port 123 remains partly open the resulting action is a combination of suction through port 123 and bleeding through port 129. The suction port 123 begins to be covered with the opening movement of the throttle and becomes fully closed with only a partial throttle opening.

When the clutch is released the tension on the piston rod has compressed spring 133 and completely opened the port 135. Even a small amount of accelerator depression has produced a large opening at 129, and notwithstanding the continued suction the piston moves back. This motion continues at a rapid rate up to the point where the clutch plates just engage. As soon as this has occurred tension on the piston rod starts to diminish as the clutch begins to engage. This permits the spring 133 to cause relative motion between parts 71 and 97, thereby decreasing the bleeding port 135.

A very limited clutch engagement is enough to partially close port 135 and, owing to the shape of this port, to materially decrease the bleeding area. The partially continued suction, when the accelerator is depressed gently, now becomes effective in cutting down the bleeding, which will, however, continue at a slower rate. As the clutch becomes more and more engaged, the port 135 becomes more and more nearly closed, and the bleeding becomes slower and slower, this action being somewhat in proportion to the opening of the throttle which regulates the intensity of the remaining suction to oppose bleeding. Port 135 becomes substantially closed but a very small part is always left open to insure eventual full engagement and prevent release bearing "riding". If the accelerator is depressed hard, this balancing suction is immediately discontinued and bleeding takes place through ports 135 and 129 unresisted. The final smoothness of engagement is not altered; the entire process merely occurs more rapidly.

Almost ideal clutch engagement under all conditions will result when the proportions of the various parts are worked out properly. The spring rate and the preload and the shape and length of port 135 can be so chosen as to give any degree of smoothness required. The length of port 123, regulating the continued suction, can be determined with due regard to low gear ratio, engine torque, and car inertia, to give very gradual maneuvering engagement in parking. Once the set-up is fixed it will never have to be changed as the clutch facings become worn.

With a device of this kind no adjustment is required. Wear of the clutch discs may require a further movement of plunger 71, but this in no way effects the operation because of the presence of the elongated chamber 127 with every part of which the opening 135 communicates. Up to the instant when the clutch plates begin to engage, the tension in cable 69 is such as to keep the aperture 135 fully open. As the tension in cable 69 decreases, the dimensions of the opening 135 gradually diminish. Therefore, the characteristic action due to the valve is always the same regardless of the wear in the clutch elements.

I claim:

1. A fluid pressure motor adapted to move a power-transmitting member having spring-actuating means, said motor comprising a power cylinder, a piston element therein movable under the influence of fluid pressure changes on a first side thereof, a piston rod element connected to said piston element and operably connected to said power-transmitting member whereby the movement of said piston element may overcome the said spring means, said piston rod element including relatively movable parts, one part having a vent opening to restore the pressure on said side of the piston, and yielding means between said parts operable to move said parts relatively to each other to normally close said opening as the tension in the piston element influenced by the spring means decreases.

2. The invention defined by claim 1, said power cylinder having a head provided with an elongated chamber with which said vent opening communicates in all positions of movement of said piston rod element.

3. The invention defined by claim 1, said power cylinder having a head provided with an elongated chamber and also with a through passage communicating with a second side of said piston, said piston rod element being reciprocable through said chamber with its vent opening always in communication therewith, a valve in said passage movable to two positions, in one of which it controls the fluid pressure on the first side of the piston and in another of which it renders the vent opening operable.

4. For use with a motor vehicle having a motor provided with a source of suction and a spring-operated clutch, a fluid pressure motor adapted to be actuated by suction from said source and having a piston element, a connection between said piston element and said clutch, said connection including relatively movable parts and yielding means therebetween together with a vent opening in one of said parts normally substantially closed by the other part under the influence of the yielding means.

5. The invention defined by claim 4, said fluid pressure motor having a head, said head having an elongated chamber in continuous communication with said vent opening, and said head also having a valve to control the suction supply from said source to said fluid pressure motor and to control the exhaust of said fluid pressure motor through said vent opening.

6. The invention defined by claim 4, said fluid pressure motor having a head, said head having an elongated chamber in continuous communication with said vent opening, and said head also having a valve to control the suction supply from said source to said fluid pressure motor and to control the exhaust of said fluid pressure motor through said vent opening together with throttle valve operating means for the motor of the motor vehicle and connections from said throttle operating means to said suction-controlling valve.

7. A fluid pressure operating means for actuating a work-performing device, comprising a power cylinder and a piston, connecting means between the piston and the work-performing device, means associated with said connecting means and responsive to the variable force therein to variably permit passage of fluid to variably determine the rate of restoration of said work-performing device to the position from which it was moved by the movement of the piston in said cylinder.

8. A fluid pressure operating means for actuating a work-performing device, comprising a power cylinder and a piston, connecting means between the piston and the work-performing device, means associated with said connection and responsive to the force therein to determine the rate of restoration of said work-performing device to the position from which it was moved by the movement of the piston in said cylinder, said means associated with said connection comprising parts mounted for relative axial movement, one of said parts having a tapered vent opening, and yielding means operable to hold said parts in a position where one of said parts substantially closes the vent opening in the other part.

9. A combined power unit and control valve comprising a chambered member and a head, a piston element dividing said chamber into two regions, means forming a conduit from one of said regions and adapted to be connected to a source of suction, the other region being open to the air, said head having an elongated chamber, a plunger reciprocable in said chamber and having at one end a tubular bore with a tapered opening between said bore and said chamber, a hollow piston rod reciprocable in said bore and connected to said piston, yielding means to normally project said piston into said bore and substantially close said tapered opening, and means connected to said plunger adapted to release the clutch.

10. The invention defined by claim 9, said head formed with a second passage communicating with the cylinder, and intersecting said conduit and also having an opening therefrom to the elongated chamber, a valve movable in said second passage and adapted when in one position to open the passage through the conduit, and in a second position to close the conduit and open the passage from said chamber to the vented side of the cylinder, and in intermediate positions to open both said conduit and said passage.

11. The invention defined by claim 9, said head formed with a second passage communicating with the cylinder, and intersecting said conduit and also having an opening therefrom to the elongated chamber, a valve movable in said second passage and adapted when in one position to open the passage through the conduit, and in a second position to close the conduit and open the passage from said chamber to the vented side of the cylinder, said valve, in moving from one of said positions to the other, occupying positions wherein both said conduit and said passage are partially open, said head having a third passage extended to intersect the conduit, and a valve therein movable to close or open said conduit.

12. In an automotive vehicle comprising a clutch having driving and driven members, a pressure differential operated power means having its movable power element connected to the driven member of said clutch, means for controlling the pressure differential acting on said power element, said means comprising means automatically operable, when and if the driving and driven members of the clutch are pressure loaded to a predetermined degree, to vary said pressure differential to effect a progressively retarded clutch engaging movement of the aforementioned movable power element.

13. In an automotive vehicle comprising a clutch having driving and driven members, a pressure differential operated power means having its movable power element connected to the driven member of said clutch, means for controlling the pressure differential acting on said power element, said means comprising means automatically operable, when and if the driving and driven members of the clutch are pressure loaded to a predetermined degree, to vary said pressure differential to slow up the clutch engaging movement of the aforementioned movable power element, said automatically operable pressure differential control means comprising a valve member incorporated in the connection between the aforementioned power element and the driven clutch member.

14. In an automotive vehicle comprising a clutch having driving and driven members, a pressure differential operated power means having its movable power element connected to the driven member of said clutch, means for controlling the pressure differential acting on said power element, said means comprising means automatically operable, when and if the driving and driven members of the clutch are pressure loaded to a predetermined degree, to vary said pressure differential to retard the operation of engaging the clutch, said automatically operable pressure differential control means comprising a valve member incorporated in the connection between the aforementioned power element and the driven clutch member, said valve constituting a combined force-transmitting element and valve member and comprising relatively movable members including a spring member.

15. In an automotive vehicle provided with a clutch comprising driving and driven members, fluid pressure operated power means for disengaging the clutch and controlling the engagement thereof, said power means comprising a valve automatically operable, when the driving and driven members of the clutch are loaded to a predetermined degree, to vary the fluid pressure of said power means to thereby decrease the rate of engagement of the clutch.

16. In an automotive vehicle provided with a clutch comprising driving and driven members, fluid pressure operated power means for disengaging the clutch and controlling the engagement thereof, said power means comprising a connection interconnecting the driven element of the clutch with the power element of said power means, said connection including a valve member, operable in accordance with the degree of tension of said connection, to automatically vary the fluid pressure of said power means and thereby decrease the rate of engagement of the clutch.

17. In an automotive vehicle provided with a clutch comprising driving and driven members, fluid pressure operated power means for disengaging the clutch and controlling the engagement thereof, said power means comprising a connection interconnecting the driven element of the clutch with the power element of said power means, said connection including a valve member, operable in accordance with the degree of tension of said connection, to vary the fluid pressure of said power means to thereby decrease the rate of engagement of the clutch, said valve comprising relatively movable rigid parts of said connection and also including a yieldable member interposed between said rigid parts.

18. In combination with a power actuated automotive clutch having driving and driven members, power means for disengaging said clutch members and controlling the engagement thereof, said power means comprising means automatically operable, at or above a given loading of the clutch members, to decrease the rate of movement of the driven clutch member as it moves into engagement with the driving member to thereby retard the completion of the clutch engaging operation of said power means.

19. In a motor vehicle, the combination of a clutch, power means connected to said clutch for disengaging the clutch and permitting its reengagement, and means for retarding the engagement of the clutch, said means being governed by means in the connection between the power means and the clutch which automatically becomes operable upon initial contact of the clutch faces.

20. In a motor vehicle, the combination of an accelerator mechanism, a clutch, power means connected to said clutch for disengaging the clutch and permitting its reengagement, and means under the control of the accelerator mechanism for retarding the engagement of the clutch, said means being governed by means in the connection between the power means and the clutch which automatically becomes operable upon initial contact of the clutch faces independently of the extent of movement necessary to bring the clutch faces into initial contact.

21. In a motor vehicle, the combination of a clutch, a fluid motor connected to said clutch for disengaging the clutch and permitting its reengagement, a valve for controlling said motor, means controlled by the valve for retarding the engagement of the clutch, and means in the connection between the motor and clutch for governing said valve-controlled retarding means, said last named means automatically becoming operable upon initial contact of the clutch faces independently of the extent of movement necessary to bring the clutch faces into initial contact.

22. In a motor vehicle, the combination of a clutch, a fluid motor connected to said clutch for disengaging the clutch and permitting its reengagement, means in said connection for causing said motor to permit said clutch to engage with a retarded action, said means comprising a spring-biased bleeder valve which is operable upon contact of the clutch faces.

OLIVER K. KELLEY.